No. 780,199. PATENTED JAN. 17, 1905.
J. A. KEY.
PISTON PACKING.
APPLICATION FILED MAY 25, 1904.

Witnesses
  E. F. Stewart
  H. S. Shepard

James A. Key, Inventor.
by C. A. Snow & Co.
Attorneys

No. 780,199. Patented January 17, 1905.

UNITED STATES PATENT OFFICE.

JAMES ALLEN KEY, OF MANDAN, NORTH DAKOTA.

PISTON-PACKING.

SPECIFICATION forming part of Letters Patent No. 780,199, dated January 17, 1905.

Application filed May 25, 1904. Serial No. 209,754.

*To all whom it may concern:*

Be it known that I, JAMES ALLEN KEY, a citizen of the United States, residing at Mandan, in the county of Morton and State of North Dakota, have invented a new and useful Piston-Packing, of which the following is a specification.

This invention relates to pistons, and has for its object to provide an improved packing therefor capable of use in connection with steam, air, or other fluid under pressure. It is furthermore designed to facilitate the application and removal of the packing elements and to maintain the same in effective engagement with the walls of the cylinder, especially at the joint or joints between the ends of the split rings and to have said joint or joints effectually closed against the escape of the motive fluid therefrom.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
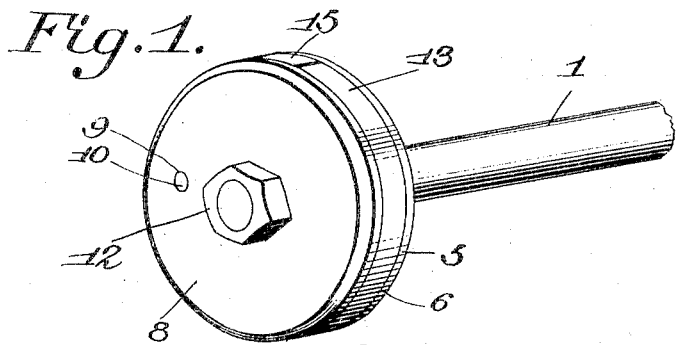
Figure 2:
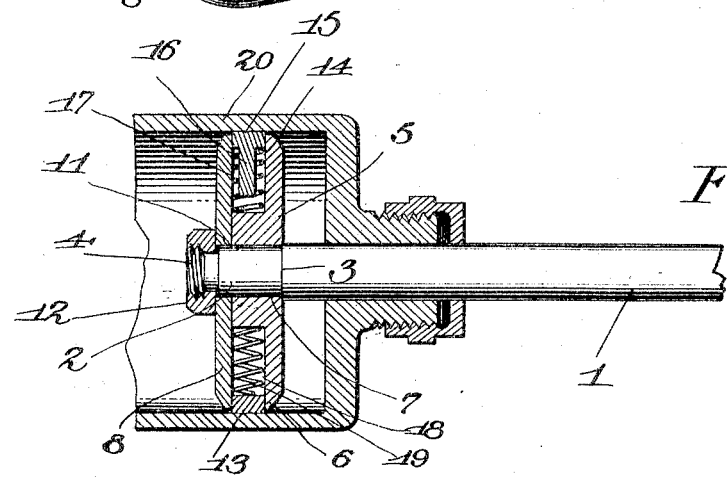
Figure 3:
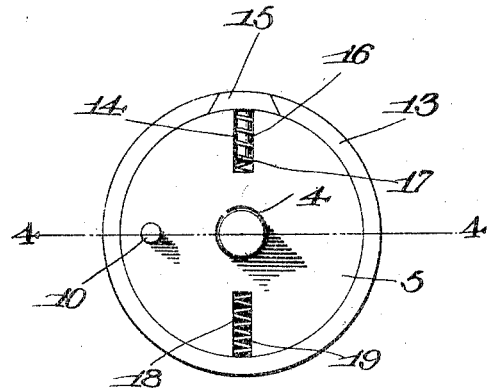
Figure 4:
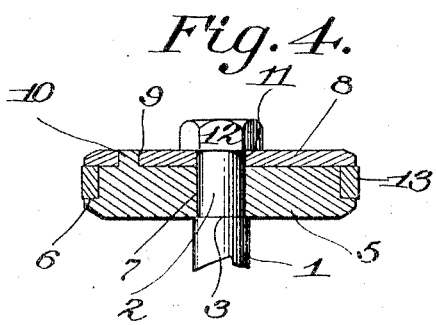

In the drawings, Figure 1 is a perspective view of a piston embodying the features of the present invention. Fig. 2 is a longitudinal sectional view thereof in a cylinder. Fig. 3 is a front elevation of the piston with the front face-plate removed. Fig. 4 is a detail cross-sectional view on the line 4 4 of Fig. 3.

Like characters of reference designate corresponding parts in each and every figure of the drawings.

In explanation of the present invention reference will be had to the accompanying drawings, wherein 1 designates an ordinary piston-rod which has its forward end reduced, as indicated at 2, to form a bearing for the piston-head and to produce an annular shoulder 3, against which the head is adapted to bear. The outer extremity of the reduced portion 2 is further reduced and screw-threaded, as at 4.

The piston consists of a circular head 5, having a peripheral flange 6 flush with one face thereof and provided with a central opening 7 to receive the reduced portion 2 of the rod. A face-plate 8 is applied to the opposite side of the piston-head with its outer peripheral edge constituting an annular flange, thereby producing an annular groove or channel between the flange 6 and the plate. This face-plate is provided with a perforation 9 to receive a pin or projection 10 upon the head and is also provided with a central opening 11 to receive the piston-rod. The screw-threaded portion 4 of the piston-rod is projected beyond the face-plate, and a nut 12 is fitted thereto to clamp the piston-head between the nut and the annular shoulder 3 of the rod. This nut also clamps the face-plate upon the piston-head while the pin and opening connection 10 and 11 prevents rotation of the face-plate upon the piston-head.

A split packing-ring 13 is fitted in the groove or channel formed around the periphery of the piston-head and has its ends beveled or undercut and separated by an interspace. The head of the piston is provided with a radial socket or opening 14, which intersects the periphery of the head and is disposed opposite the interval between the ends of the split packing-ring. A plunger 15 is fitted in the interval between the ends of the packing-ring and has its ends beveled to fit the beveled ends of the ring and constitute a continuation thereof, so as to close the interval between the ends of the ring and prevent the escape therethrough of the motive fluid. This plunger has a stem 16, working in the socket 14, with a helical spring 17 embracing the stem and bearing in opposite directions against the back of the socket and the plunger, thereby to place an outward tension upon the plunger, which in turn exerts an expanding pressure upon the split ring through the medium of the lap-joints between the ends of the plunger and the ends of the ring. At a point diametrically opposite the socket 14 there is another socket, 18, and in this socket is a helical spring 19, which bears against the inner periphery of the packing-ring, so as to balance the pressure of the spring 17, and thereby maintain an equal projection of the packing-ring at all points beyond the periphery of the flanges of the piston.

When the plunger is working in the cylinder 20, the packing-ring will be maintained in snug engagement with the inner walls of the cylinder under the tension of the springs 17 and 19, and the plunger 15 operates to close the space between the ends of the split packing-ring, and thereby prevent the escape of the motive fluid therefrom to the opposite side of the piston.

From the foregoing description it will be understood that the springs are housed within the piston and are thereby not liable to become displaced, and the face-plate of the piston is capable of being conveniently removed to give access to the packing-ring and the spring to replace the same when worn or damaged. Instead of a single ring it is of course apparent that a plurality of packing-rings may be employed, and as this is obvious it has not been deemed necessary to illustrate the same.

Having thus described the construction and operation of my invention, what I claim as new, and desire to secure by Letters Patent, is—

1. A piston comprising a head having an annular channel and a pair of diametrically opposite substantially radial sockets intersecting the back of the channel, a split packing-ring fitted in the channel and having its ends located at opposite sides of one of the sockets, a plunger interposed between the ends of the ring and having beveled lapped joints therewith to constitute a continuation of the ring, a stem carried by the plunger and working in the adjacent socket, a spring within the socket to force the plunger outwardly, and a spring located within the socket and bearing against the adjacent portion of the packing-ring to maintain the latter concentric with respect to the piston-head.

2. A piston comprising a head having an annular channel, a split packing-ring fitted in the channel and provided with undercut ends, a plunger fitted between the ends of the split ring and forming a continuation thereof with the ends of the plunger beveled to underlie the ends of the ring, and means to maintain an outward tension upon the plunger.

3. A piston comprising a head having an annular channel and provided with a pair of diametrically opposite sockets intersecting the back of the channel, a split packing-ring fitted in the channel with its ends lying at opposite sides of one of the sockets, a plunger fitted between the ends of the ring and constituting a continuation thereof with its ends overlapped by the ends of the ring, a spring within the socket and bearing radially outward against the plunger, and a balance-spring located in the other socket and bearing radially outward against the ring to maintain the latter centered upon the piston.

4. The combination of a piston-rod, a piston-head pierced thereby and having a peripheral flange, a face-plate applied to the opposite face of the head and projected at the periphery thereof to form a flange, the space between the two flanges constituting an annular channel, a nut fitted to the outer end of the rod to clamp the face-plate upon the head and hold the head upon the rod, a split packing-ring fitted within the channel with its ends undercut, the head having a pair of diametrically opposite recesses formed in the periphery thereof with one of the recesses located between the ends of the packing-ring, a plunger fitted between the ends of the packing-ring and provided with beveled ends to underlie the ends of the ring and form a continuation thereof, a stem carried by the plunger and working in the adjacent recess, a spring in the recess and bearing against the plunger to force the same outwardly, and another spring in the other recess and bearing against the ring to maintain the latter centered upon the piston.

In testimony that I claim the foregoing as my own I have hereto affixed my signature in the presence of two witnesses.

JAMES ALLEN KEY.

Witnesses:
 HUGH L. PEOPLES,
 JNO. B. RACEK.